US012664848B2

(12) United States Patent
Yokoyama

(10) Patent No.: US 12,664,848 B2
(45) Date of Patent: Jun. 23, 2026

(54) FACE AUTHENTICATION METHOD

(71) Applicant: NEC Corporation, Tokyo (JP)

(72) Inventor: Hiroki Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 597 days.

(21) Appl. No.: 18/010,098

(22) PCT Filed: Apr. 27, 2021

(86) PCT No.: PCT/JP2021/016855
§ 371 (c)(1),
(2) Date: Dec. 13, 2022

(87) PCT Pub. No.: WO2021/256099
PCT Pub. Date: Dec. 23, 2021

(65) Prior Publication Data
US 2023/0267788 A1      Aug. 24, 2023

(30) Foreign Application Priority Data

Jun. 17, 2020    (JP) ................................. 2020-104263

(51) Int. Cl.
*G07C 9/37* (2020.01)
*G06V 40/16* (2022.01)
*G07C 9/10* (2020.01)
(52) U.S. Cl.
CPC ............. *G07C 9/37* (2020.01); *G06V 40/168* (2022.01); *G06V 40/172* (2022.01); *G06V 40/178* (2022.01); *G07C 9/10* (2020.01)

(58) Field of Classification Search
CPC .......... G07C 9/37; G07C 9/10; G06V 40/168; G06V 40/172; G06V 40/178; G06V 20/52; G06V 40/161; E05B 49/00; G06T 7/00
See application file for complete search history.

(56) References Cited

U.S. PATENT DOCUMENTS

2009/0161921 A1* 6/2009 Ohnishi ............... G06V 40/172
382/115
2010/0054550 A1* 3/2010 Okada .................. G06V 40/175
382/118
(Continued)

FOREIGN PATENT DOCUMENTS

JP      H07-073298 A      3/1995
JP      2006-132195 A      5/2006
(Continued)

OTHER PUBLICATIONS

English machine translation for Entry Control System (JP 2016146073 by Doizaki) (Year: 2016).*
(Continued)

*Primary Examiner* — Wassim Mahrouka
(74) *Attorney, Agent, or Firm* — Sughrue Mion, PLLC

(57) ABSTRACT

A face authentication device 100 of the present invention includes an extraction means 121 for extracting a plurality of face images in a captured image, a determination means 122 for determining, on the basis of at least one of the face images, determining whether or not the person of the face image satisfies an exclusion condition of a face authentication process, and an authentication means 123 for excluding the face image of the person satisfying the exclusion condition, and performing the face authentication process on another face image to authenticate whether or not the person of the other face image is a registered person.

18 Claims, 10 Drawing Sheets

(56) References Cited

U.S. PATENT DOCUMENTS

| | | | | |
|---|---|---|---|---|
| 2019/0213816 A1* | 7/2019 | Grigorov | .................. | G06T 7/20 |
| 2019/0259014 A1* | 8/2019 | Katayama | ................ | G06F 3/14 |
| 2020/0398699 A1* | 12/2020 | Tsuchiya | .................. | G06T 7/74 |
| 2022/0148315 A1* | 5/2022 | Blott | ...................... | G06V 10/23 |
| 2023/0410555 A1 | 12/2023 | Kochi et al. | | |

FOREIGN PATENT DOCUMENTS

| | | | | | |
|---|---|---|---|---|---|
| JP | 2009-205392 A | 9/2009 | | | |
| JP | 2010-061465 A | 3/2010 | | | |
| JP | 2016-146073 A | 8/2016 | | | |
| JP | 2019-053674 A | 4/2019 | | | |
| JP | 2019-133364 A | 8/2019 | | | |
| WO | WO-2019058800 A1 * | 3/2019 | ............ | E05B 49/00 | |
| WO | 2020/075308 A1 | 4/2020 | | | |

OTHER PUBLICATIONS

Verification System (English translation of WO 2019058800 by Kochi) (Year: 2019).*

International Search Report for PCT Application No. PCT/JP2021/016855, mailed on Jul. 20, 2021.

Singapore Office Action for SG Application No. 11202261233S, mailed on Mar. 27, 2026.

* cited by examiner

Fig.8

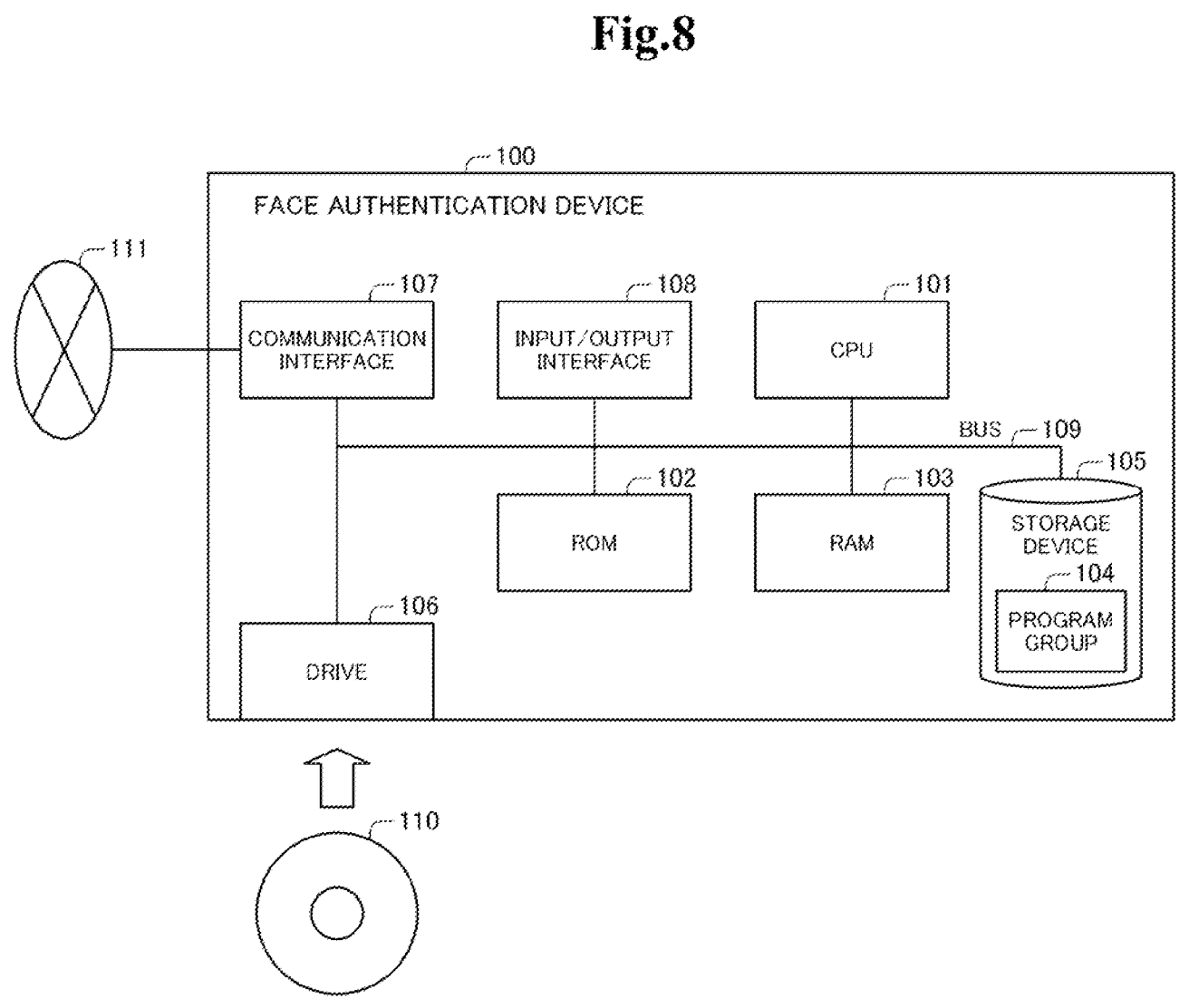

FACE AUTHENTICATION DEVICE — 100

COMMUNICATION INTERFACE — 107

INPUT/OUTPUT INTERFACE — 108

CPU — 101

BUS — 109

STORAGE DEVICE — 105

PROGRAM GROUP — 104

DRIVE — 106

ROM — 102

RAM — 103

110

111

FACE AUTHENTICATION METHOD

This application is a National Stage Entry of PCT/JP2021/016855 filed on Apr. 27, 2021, which claims priority from Japanese Patent Application 2020-104263 filed on Jun. 17, 2020, the contents of all of which are incorporated herein by reference, in their entirety.

TECHNICAL FIELD

The present invention relates to a face authentication method, a face authentication device, and a program.

BACKGROUND ART

Recently, from a viewpoint of security and convenience, a system using face authentication is widely used to authenticate whether or not a person is a registered person. For example, in a store such as a convenience store, a practical experiment of an unmanned store is developed to solve a problem of a decrease in staff due to depopulation. In such an unmanned store, it is conceivable to use face authentication for an access to the store and settlement. In order to use face authentication, a user needs to register a face image in advance.

Here, when a registered person attempts to enter a specific place such as a store together with an accompanying person, a problem of tailgating in which the accompanying person passes through the entrance along with the registered person even though such an accompanying person is not registered, may occur. However, in the case of performing face authentication for an access to an unmanned store as described above, it is necessary to solve the problem of tailgating from the viewpoint of security such as shoplifting. With respect to such a problem, in Paten Literature 1, the number of persons existing in an image near a gate is measured, and the number of persons who are registered persons is measured from the face images of the persons, and when the measured numbers of persons match, the gate is opened.

Patent Literature 1: JP 2006-132195 A

SUMMARY

However, in the operation of prohibiting tailgating to a specific place such as a store by using face authentication in order to improve security as described above, the problems as described below occur. First, as one problem, even when tailgating is not a problem such as the case where an accompanying person of a registered person is a child of the registered person, such an accompanying person is not allowed to enter. Therefore, for entering the store, the accompanying person also needs to register, so that the procedure becomes complicated. Moreover, as another problem, it is necessary to perform a face authentication process on all persons shown on the camera even an accompanying person. This increases the processing load of calculating the feature amounts of the face images. As described above, in a situation in which a registered person is together with an accompanying person, an attempt to improve the security as described above causes a problem that it is difficult to perform a face authentication process smoothly due to a complicated procedure and an increase in the load of the face authentication process.

In view of the above, an object of the present invention is to provide a face authentication method capable of solving the problem described above, that is, a problem that a face authentication process cannot be performed smoothly when a registered person is together with an accompanying person.

A face authentication method, according to one aspect of the present invention, is configured to include extracting a plurality of face images in a captured image, on the basis of at least one of the face images, determining whether or not a person of the face image satisfies an exclusion condition of a face authentication process, and excluding the face image of the person satisfying the exclusion condition, and performing the face authentication process on another one of the face images to authenticate whether or not a person of the other one of the face images is a registered person.

Further, a face authentication device, according to one aspect of the present invention, is configured to include an extraction means for extracting a plurality of face images in a captured image, a determination means for, on the basis of at least one of the face images, determining whether or not a person of the face image satisfies an exclusion condition of a face authentication process, and an authentication means for excluding the face image of the person satisfying the exclusion condition, and performing the face authentication process on another one of the face images to authenticate whether or not a person of the other one of the face images is a registered person.

Further, a program, according to one aspect of the present invention, is configured to cause an information processing device to implement an extraction means for extracting a plurality of face images in a captured image, a determination means for, on the basis of at least one of the face images, determining whether or not a person of the face image satisfies an exclusion condition of a face authentication process, and an authentication means for excluding the face image of the person satisfying the exclusion condition, and performing the face authentication process on another one of the face images to authenticate whether or not a person of the other one of the face images is a registered person.

With the configurations described above, the present invention enables a face authentication process to be performed smoothly when a registered person is together with an accompanying person.

BRIEF DESCRIPTION OF DRAWINGS

FIG. 8 is a block diagram illustrating a hardware configuration of a face authentication device according to a second exemplary embodiment of the present invention.

EXEMPLARY EMBODIMENTS

First Exemplary Embodiment

Figure 5:
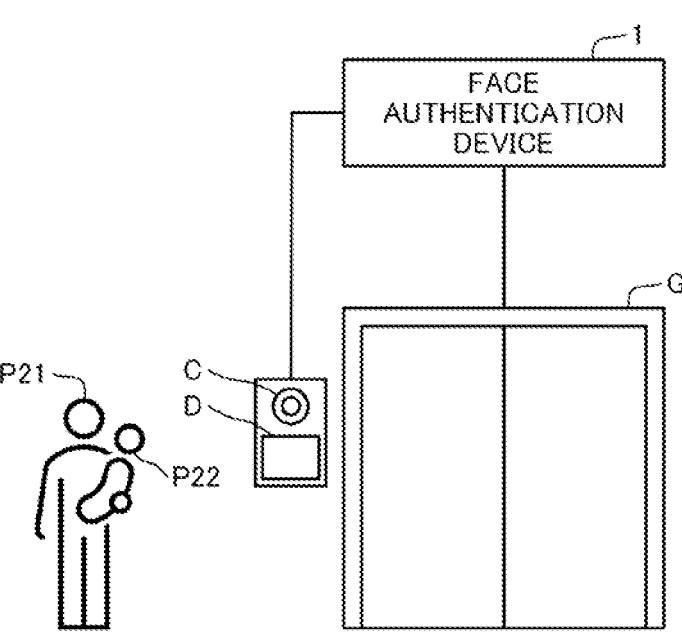
FIG. 5 illustrates another example of a used state of the face authentication system disclosed in FIG. 1.
Figure 6:
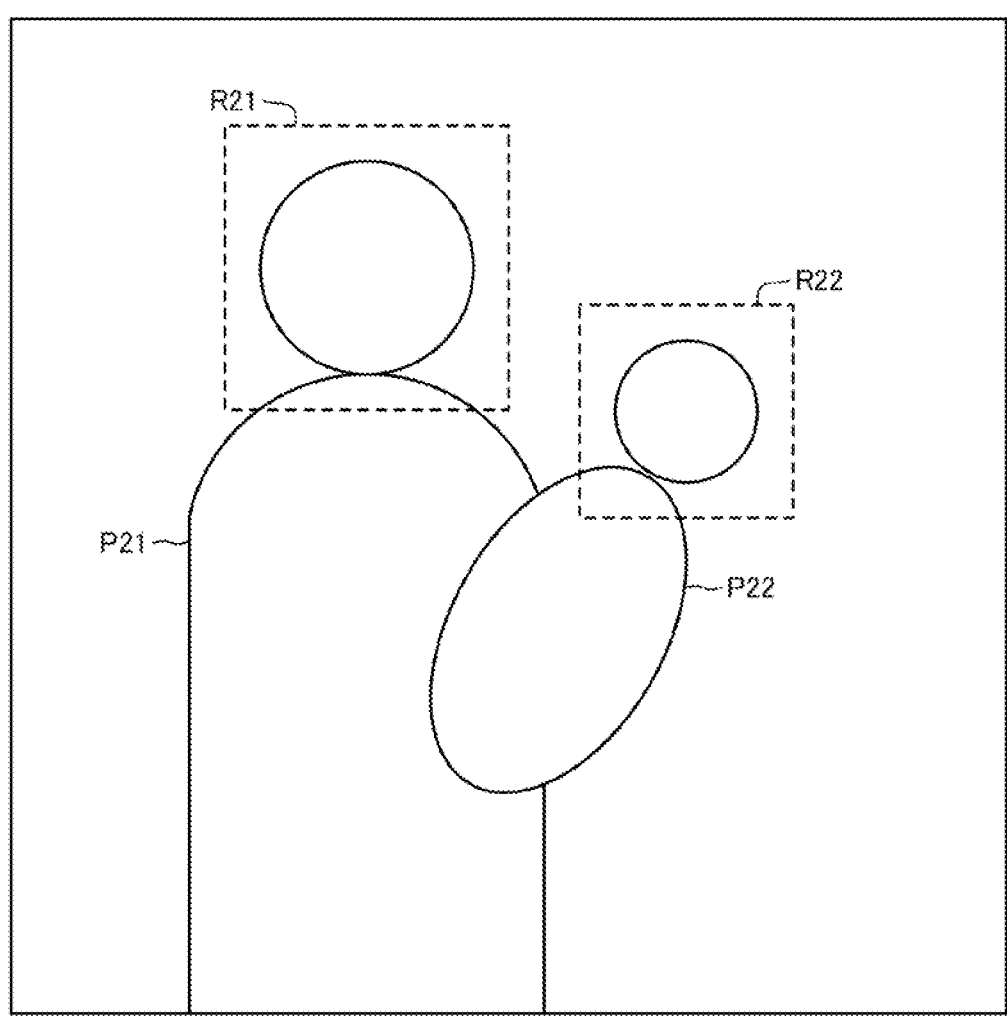
FIG. 6 illustrates another example of processing a captured image by the face authentication device disclosed in FIG. 1.
Figure 7:
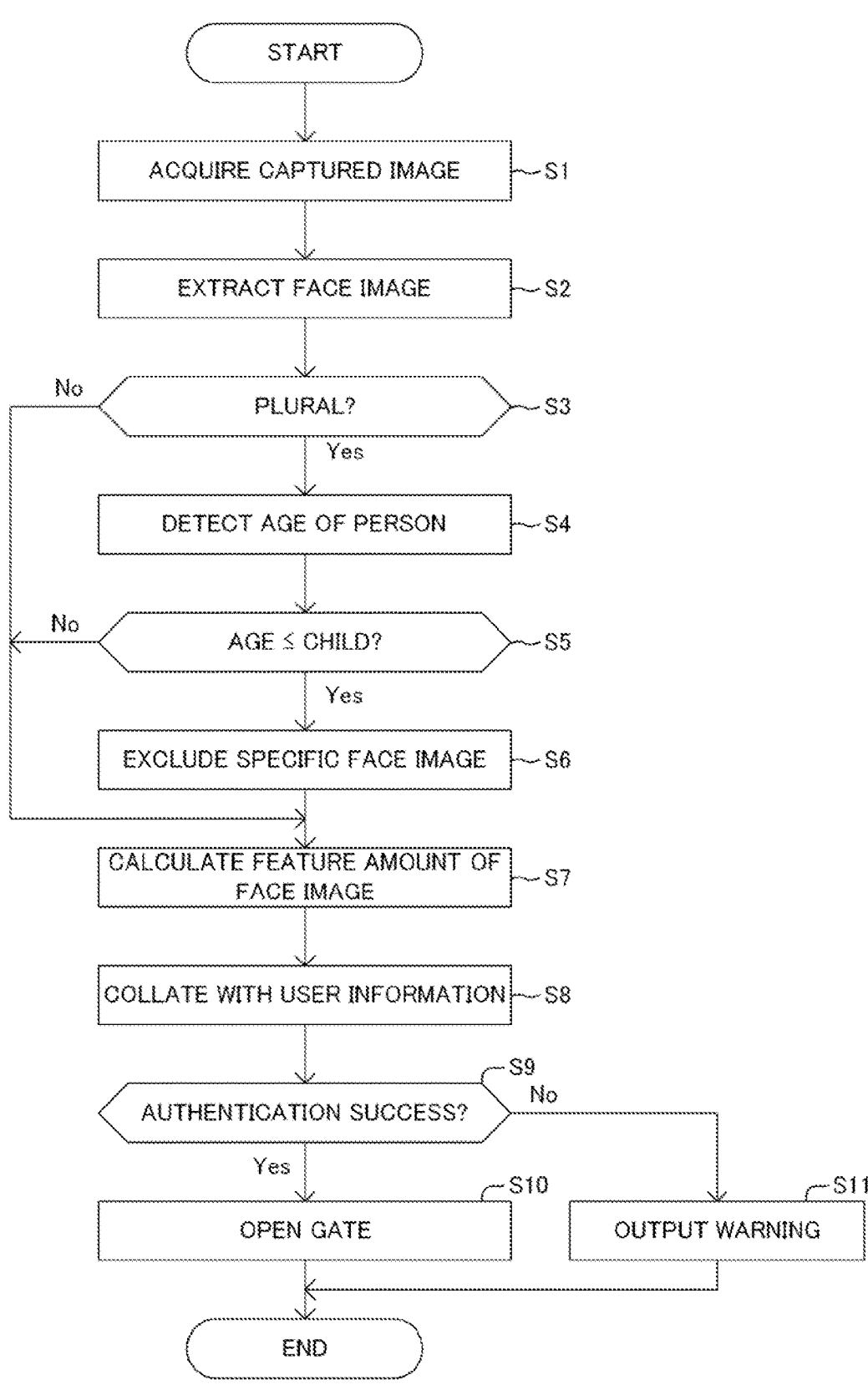
FIG. 7 is a flowchart illustrating a processing operation by the face authentication device disclosed in FIG. 1.

A first exemplary embodiment of the present invention will be described with reference to FIGS. 1 to 7. FIGS. 1 to 6 are diagrams for explaining a configuration of a face authentication system, and FIG. 7 is an illustration for explaining the processing operation of the face authentication system.

Configuration

A face authentication system of the present invention is a system to be used for performing face authentication using a face image of a person, and limiting and managing entrance/exit of a person at a specific location such as an office, a store, or an event site. For example, in the present embodiment, a specific place is an unmanned store, and from the viewpoint of security, in front of a gate G (door) provided at the entrance of the store, a face image of an entering person is captured and is determined whether or not the person is a registered person through face authentication, and when the authentication succeeds, the gate G is opened to allow the person to enter. However, the face authentication system of the present invention is not limited to be provided at the gate G of the store, and may be provided at any place. Moreover, the face authentication system of the present invention does not necessarily open the gate G according to the result of face authentication, and may be used for any process such as using the result of face authentication for settlement or the like.

Figure 1:
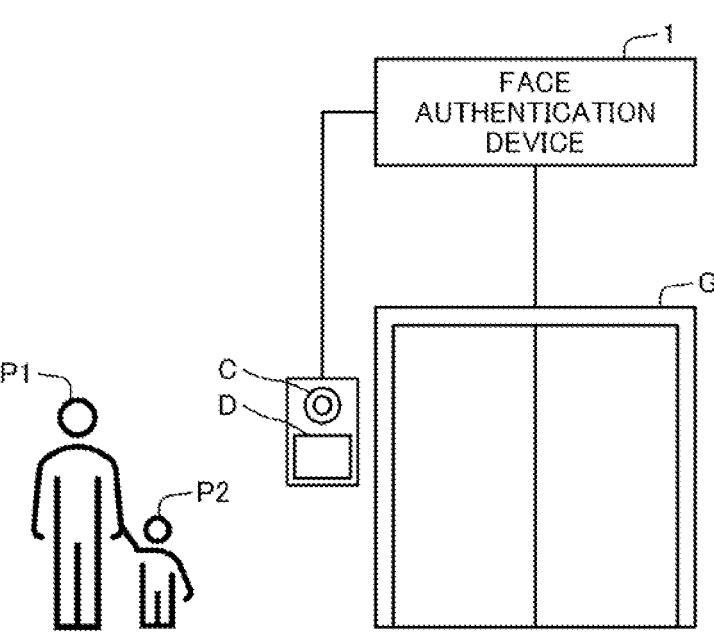
FIG. 1 illustrates the overall configuration and an example of a used state of a face authentication system according to a first exemplary embodiment of the present invention.

As illustrated in FIG. 1, the face authentication system includes a gate G provided to an unmanned store, a camera C that is an imaging device provided adjacent to the gate G and a display D that is a display device, and a face authentication device 1 provided at an arbitrary place.

The gate G is an automatic door serving as an entry to the unmanned store, and is opened and closed according to a command from the face authentication device 1 as described below. For example, the gate G is only used for an entrance to the inside of the unmanned store.

The camera C is disposed at a position where it can image a user visiting the unmanned store, that is, a user who stands in front of the gate G. In particular, the height, the angle of view, and the like of the camera C are set so as to be able to capture an image including a face of a user of any height. The camera C regularly captures images, and the captured images are transferred to the face authentication device 1. However, the position where the camera C is disposed is not limited to the position described above.

The display D is disposed below the camera C at a position where it can be viewed by a user who faces the camera C for face authentication. The display D displays a result of a face authentication process transmitted from the face authentication device 1 as described below, that is, information indicating an authentication success or an authentication failure, for example. However, the position where the display D is disposed is not limited to the position described above.

Figure 2:
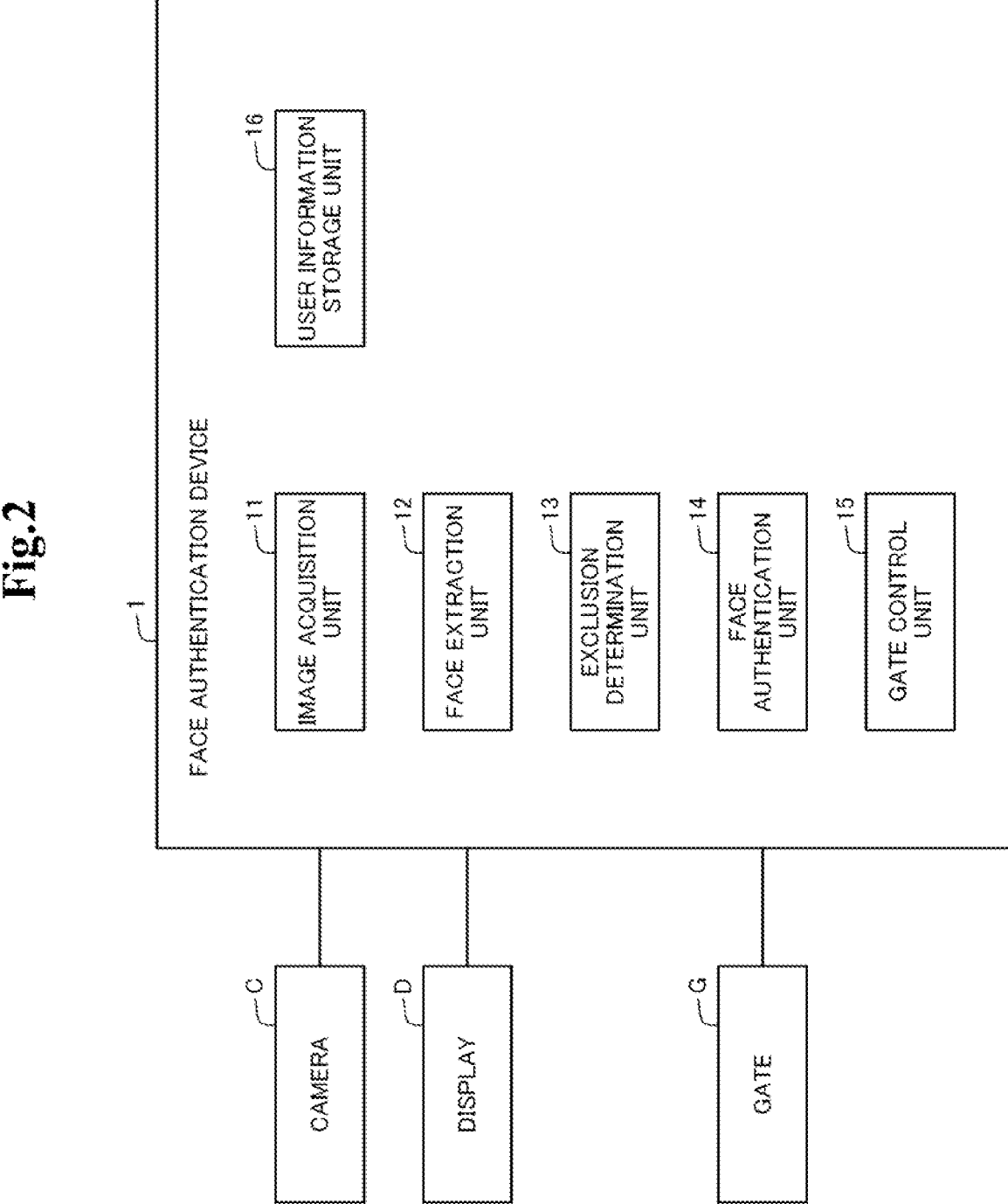
FIG. 2 is a block diagram illustrating a configuration of a face authentication device disclosed in FIG. 1.

The face authentication device 1 is configured of one or a plurality of information processing devices each having an arithmetic device and a storage device. As illustrated in FIG. 2, the face authentication device 1 includes an image acquisition unit 11, a face extraction unit 12, an exclusion determination unit 13, a face authentication unit 14, and a gate control unit 15. The respective functions of the image acquisition unit 11, the face extraction unit 12, the exclusion determination unit 13, and the face authentication unit 14, and the gate control unit 15 can be realized through execution, by the arithmetic unit, of a program for implementing the respective functions stored in the storage device. The face authentication device 1 also includes a user information storage unit 16. The user information storage unit 16 is configured of a storage device. Hereinafter, the respective constituent elements will be described in detail.

The image acquisition unit 11 first acquires a face image of a user who desires to register with an unmanned store, and stores the face image in the user information storage unit 16. For example, when a person P1 illustrated in FIG. 1 desires to be a registered person of an unmanned store, the image acquisition unit 11 acquires a face image of the person P1 captured by the person P1 by himself/herself or captured by a person in charge of the store, and stores it as user information. For the face image of the person P1 as a registered person, the feature amount of the face image may be calculated as described above and the feature amount may be stored. As the user information, name, contact, settlement information, and the like are also included, together with the face image of the person P1 who is a registered person.

Figure 3:
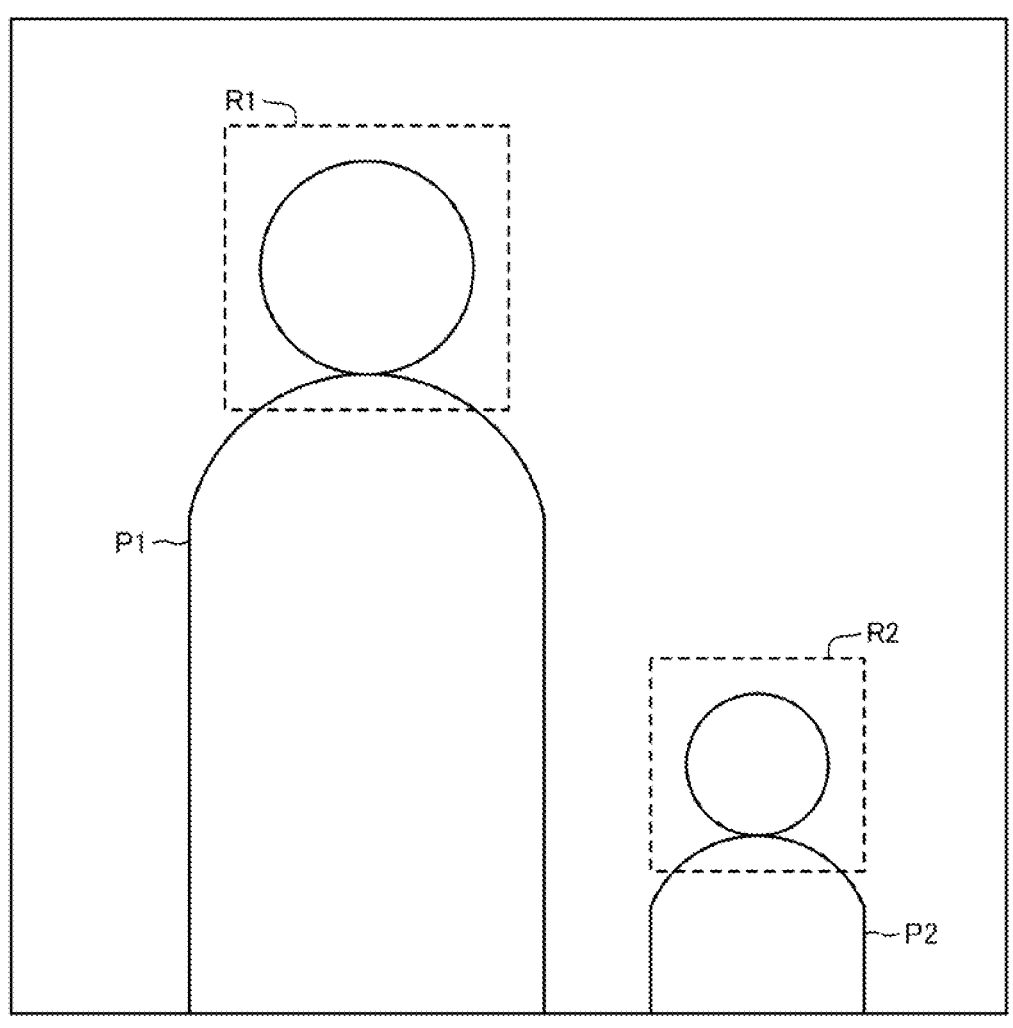
FIG. 3 illustrates an example of processing a captured image by the face authentication device disclosed in FIG. 1.

The image acquisition unit 11 also receives captured images of the front of the gate G of the unmanned store, captured by the camera C, at constant time intervals. For example, when two persons P1 and P2 are located in front of the store as illustrated in FIG. 1, a captured image including the face images of the two persons P1 and P2 is acquired as illustrated in FIG. 3. Note that one of the two persons P1 and P2 illustrated in FIG. 1 is a registered person P1 of the unmanned store, and the other person is not registered as a user with the unmanned store, and is a child of the registered person P1 and is an accompanying person P2 who visits the unmanned store with the registered person P1.

Figure 4:
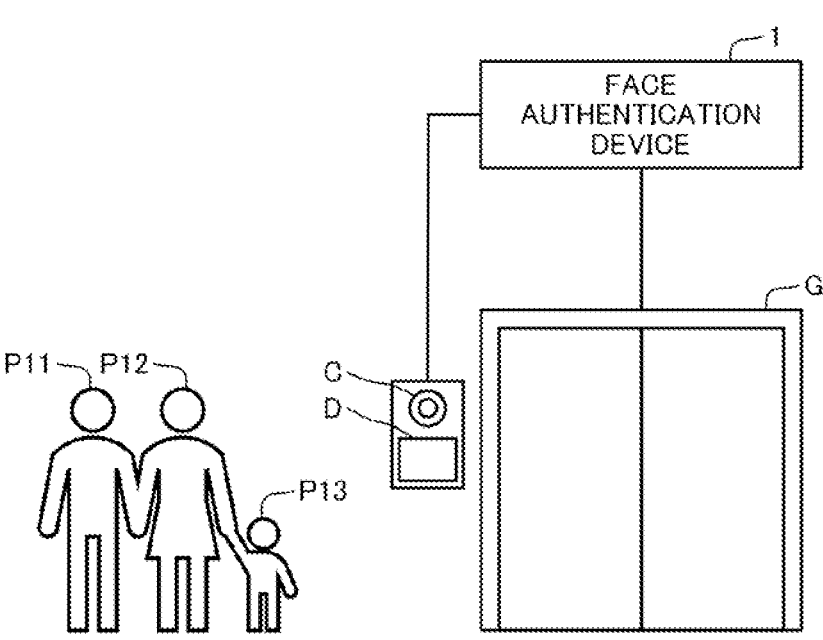
FIG. 4 illustrates another example of a used state of the face authentication system disclosed in FIG. 1.

The face extraction unit 12 (extraction means) extracts a person in the captured image from the shape, color, motion, and the like of an object shown in the captured image, and also extracts a face image area of the person. For example, as illustrated in FIG. 3, the face extraction unit 12 extracts a face image area R1 of the person P1 who is a registered person, and a face image area R2 of the person P2 who is an accompanying person. At that time, when there are a plurality of face images simultaneously shown in the captured image, the face extraction unit 12 extracts a plurality of face image areas collectively and associates the face image areas with one another. For example, as illustrated in FIG. 4, when three persons P11, P12, and P13 appear in front of the gate G of the unmanned store, three face image areas are extracted (not illustrated). Moreover, as illustrated in FIG. 5, when a person P21 holding a person P22 who is a child appears in front of the gate G of the unmanned store, face image areas R21 and R22 of the two persons P21 and P22 are extracted respectively, as illustrated in FIG. 6.

The exclusion determination unit 13 (determination means) determines whether or not the persons P1 and P2 of the face image areas R1 and R2 extracted as illustrated in FIG. 3 satisfy the exclusion condition of face authentication processing as described below. At that time, when a plurality of face image areas R1 and R2 are extracted, for each of the persons P1 and P2 in the face image areas R1 and R2, the exclusion determination unit 13 determines whether or not each person satisfies the exclusion condition of the face authentication process. Specifically, the exclusion determination unit 13 detects the age (age group) of each pf the persons P1 and P2 as an attribute of the persons P1 and P2 based on the face images of the respective face image areas R1 and R2, and determines whether or not the attribute satisfies the exclusion condition. At that time, the exclusion determination unit 13 performs a preset analysis process on the face image of each of the persons P1 and P2 to detect the age from the features on the face image. For example, when detecting an age group such as "elderly", "adult", or "child", in the example of FIG. 3, the exclusion determination unit 13 detects that the attribute of the person P1 is "adult", and detects that the attribute of the person P2 is "child". Here, assuming that "elderly" and "child" are set to satisfy the exclusion condition, the exclusion determination unit 13 determines that the person P1 does not satisfy the exclusion condition of the face authentication process, and the person P2 satisfies the exclusion condition of the face authentication process. At that time, the exclusion determination unit 13 calculates the value of the age of the person based on the face image, and when the value is lower than a preset threshold age that is determined to be a child, the exclusion determination unit 13 may determine that the person satisfies the exclusion condition of the face authentication process.

Here, even though there are a plurality of extracted face image areas R1 and R2 as illustrated in FIG. 3, the exclusion determination unit 13 may determine whether or not the person of at least one face image area satisfies the exclusion condition of the face authentication process. For example, in the example of FIG. 3, the exclusion determination unit 13 may detect the attribute regarding only the face image area R2 of the person P2, and determine whether or not the person P2 satisfies the exclusion condition of the face authentication process. As a result, the face image area R2 of the person P2 is determined to satisfy the exclusion condition of the face authentication process. However, the face image area R1 of the person P1, not determined, is handled as not satisfying the exclusion condition of the face authentication process, and the face authentication process is executed as described below.

Note that the exclusion determination unit 13 is not limited to detect the attribute such as the age of a person by only using a face image in a face image area. For example, the attribute of a person may be detected by using the height, posture, size of the face area, or the like of the person detected from a captured image. For example, in the example of FIG. 4, three persons P11, P12, and P13 are shown in the captured image. Along with age detection using the features on the face images, it is possible to detect the attribute of the person P13 to be "child" on the basis of the difference in height of the person P13 from those of the two persons P11 and P12. Further, in the example of FIG. 6, face image areas R21 and R22 of the two persons P21 and P22 are extracted. On the basis of the distance between the face image areas R21 and R22, it is possible to detect the attribute of the persons P21 and P22. In that case, the two face image areas R21 and R22 are in a very close distance, and are located within a predetermined distance range. Therefore, it may be determined that a an adult holds a child, so that it is detected that the attribute of one person P21 is "adult" and the attribute of the other person P22 is "child". At that time, the exclusion determination unit 13 may refer to the position relationship or posture of each persons P21 and P22 to detect the attribute of the persons P21 and P22.

Note that as an attribute of a person, the exclusion determination unit 13 may detect another attribute rather than age. For example, the exclusion determination unit 13 may detect an attribute such as the gender of a person, on the basis of the features of a face image in a face image area. In that case, for example, when an unmanned store is a store handling goods for women, the exclusion determination unit 13 determines that a person whose attribute is woman satisfies the exclusion condition of the face authentication process. However, the attribute detected by the exclusion determination unit 13 and the exclusion condition described above are examples. Any attribute may be detected and any exclusion condition may be set.

Further, in the process of detecting an attribute of a person by the exclusion determination unit 13 described above, an analysis process is performed on a person image including the face image of the person. However, the processing load and the calculation amount of such an analysis process is smaller than the processing load and the calculation amount of feature amount calculation performed on the face image at the time of face authentication process of the person, as described below. For example, in the above description, the case where the exclusion determination unit 13 performs an analysis process on the face image to detect features regarding the age, and the case where the exclusion determination unit 13 calculates the distance between the faces, have been described. These analysis processes are processes in which the processing load and the calculation amount are less than those in the feature amount calculation of the face image that is performed in the face authentication process of a person.

The face authentication unit 14 (authentication means) performs a face authentication process on a face image area determined not to satisfy the exclusion condition, while excluding the face image areas determined to satisfy the exclusion condition of the face authentication process as described above. Therefore, in the example of FIG. 3, a face authentication process is performed on the face image area R1 of the person P1 whose attribute is determined to be "adult", and a face authentication process is not performed on the face image area R2 of the person P2 whose attribute is determined to be "child". Specifically, as a face authentication process, the face authentication unit 14 calculates the feature amount of the face image in the face image area. Then, the face authentication unit 13 calculates the similarity between the calculated feature amount and the feature amount of the face image of a registered person stored in the user information storage unit 16, and performs authentication as to whether or not the person P1 is a registered person on the basis of the similarity. Here, when the similarity between the feature amounts of the face images is equal to or larger than a threshold, the face authentication unit 14 determines that the person P1 is a registered person so that the face authentication process succeeded. However, the face image area on which the face authentication process is performed by the face authentication unit 14 also includes a face image area handled as not satisfying the exclusion condition because it is not determined whether or not to satisfy the exclusion condition, as described above.

Note that in the example of FIG. 4, the face authentication unit 14 performs the face authentication process on the face image areas of the two persons P11 and P12 whose attribute is determined to be "adult", and does not perform the face authentication process on the face image area of the person P13 whose attribute is determined to be "child". Moreover, in the example of FIG. 6, the face authentication unit 14 performs the face authentication process on the face image area of the person P21 whose attribute is determined to be "adult", and does not perform the face authentication process on the face image area of the person P22 whose attribute is determined to be "child".

The gate control unit 15 (gate control means) controls the gate G to open when the face authentication process succeeded. In the example of FIG. 3, when the face authentication process of the person P1 who is a registered person succeeded, the gate control unit 15 opens the gate G without performing the face authentication process on the person P2 who is an accompanying person to allow the person P1 who is a registered person and the person P2 who is an accompanying person to enter the unmanned store. In the example of FIG. 4, when the persons P11 and P12 are registered persons and the face authentication process of the persons P11 and P12 succeeded, the gate control unit 15 opens the gate G without performing the face authentication process on the person P13 who is an accompanying person to allow the persons P11 and P12 who are registered persons and the person P13 who is an accompanying person to enter the unmanned store. Here, the gate control unit 15 may control the gate to open only when the authentication succeeded for all of the persons P11 and P12 on which the face authentication process was performed. However, the gate control unit 15 may open the gate when the authentication succeeded for only one of the persons P11 and P12 on which the face authentication process was performed. That is, for a group of a plurality of persons, when there is at least one registered person and the face authentication process performed on the person succeeded, the gate control unit 15 may open the gate to allow all accompanying persons to enter. In the example of FIG. 6, when the persons P21 is a registered person and the face authentication process performed on the person P21 succeeded, the gate control unit 15 opens the gate G without performing the face authentication process on the person P22 who is an accompanying person, and allows the persons P21 who is a registered person and the person P22 who is an accompanying person to enter the unmanned store.

Moreover, upon receipt of a result of the face authentication process, the gate control unit 15 may output information corresponding to the result of the face authentication process to display it on the display D. For example, when the face authentication process succeeded, the gate control unit 15 outputs information to display that the authentication succeeded and that the gate G opens. In contrast, when the face authentication process failed, the gate control unit 15 outputs information to display that the authentication failed and that the gate G is not allowed to open. Note that the gate control unit 15 may output any information to any device such as lighting a lamp, not illustrated, disposed in the periphery of the gate G to output warning indicating a failure in authentication.

Operation

Next, operation of the face authentication device 1 described above will be described with mainly reference to the flowcharts of FIG. 7. The face authentication device 1 regularly acquires captured images of the front of the gate G that is an entrance of an unmanned store, from the camera C (step S1). Then, the face authentication device 1 extracts a face image area of a person from the acquired captured images. For example, as illustrated in FIG. 3, the face authentication device 1 extracts the face image area R1 of the person P1 who is a registered person, and the face image area R2 of the person P2 who is an accompanying person (step S2).

Then, when a plurality of face image areas R1 and R2 are extracted as illustrated in FIG. 3 (Yes at step S3), the face authentication device 1 detects the age of the persons P1 and P2 of the face image areas R1 and R2 respectively (step S4). For example, in the example of FIG. 3, from the features of the face images in the face image areas R1 and R2, the face authentication device 1 detects the age of the persons P1 and P2. In the example of FIG. 6, the face authentication device 1 detects the age of the persons P1 and P2 from the fact that the distance between the face image areas R21 and R22 are close to each other. Then, when the age of the detected person is child (Yes at step S5), the face authentication device 1 determines that the person who is a child satisfies the exclusion condition of the face authentication process, and excludes the face image area of such a person from the face authentication process (step S6). For example, in the example of FIG. 3, when the face authentication device 1 detects that the age of the person P1 is "adult" and the age of the person P2 is "child", the face authentication device 1 determines that the person P1 does not satisfy the exclusion condition of the face authentication process and the person P2 satisfies the exclusion condition of the face authentication process. As described above, the face authentication device 1 detects the attribute of a person before calculating the feature amount of the face image for face authentication in the following face authentication process, and determines whether or not it satisfies the exclusion condition of the face authentication process.

Then, the face authentication device 1 performs the face authentication process only on the face image area determined not to satisfy the exclusion condition, while excluding the face image area determined to satisfy the exclusion condition of the face authentication process. Therefore, in the examples of FIGS. 3 and 6, the face authentication process is performed on the face image area R1 of the person P1 whose attribute is determined to be "adult", and the face authentication process is not performed on the face image area R2 of the person P2 whose attribute is determined to be "child". Specifically, as a face authentication process, the face authentication device 1 first calculates the feature amount for the face authentication process of the face image in the face image area R1 (step S7). Then, the face authentication device 1 calculates the similarity between the calculated feature amount and the feature amount of the face image of a registered person previously stored as user information, and performs authentication as to whether or not the person P1 is a registered person on the basis of the similarity (step S8).

Then, the face authentication device 1 determines that the person P1 is a registered person, and when the face authentication process succeeded (Yes at step S9), the face authentication device 1 performs control to open the gate G (step S10). On the contrary, when the face authentication failed, the face authentication device 1 outputs warning information indicating that the authentication failed and that the gate is not allowed to open (step S11).

As described above, in the present invention, face images of a plurality of persons are extracted, and from such face images, it is determined whether or not each person satisfies the exclusion condition of the face authentication process, and the face authentication process is not performed on the face image satisfying the exclusion condition, and the face authentication process is performed only on the other face images. Therefore, when an accompanying person of a person who is a registered person on which face authentication should be performed satisfies the exclusion condition of the face authentication process, the face authentication process is not performed on the accompanying person. Therefore, it is possible to prevent an unnecessary face authentication process from being performed. Then, the face authentication process is performed only on the registered person, and control is performed to open the gate only when the authentication succeeded to allow tailgating of the accompanying person. Therefore, registration for the face authentication process or the like is not necessary for the accompanying person. As a result, it is possible to realize a smooth face authentication process while improving the security.

Second Exemplary Embodiment

Figure 9:
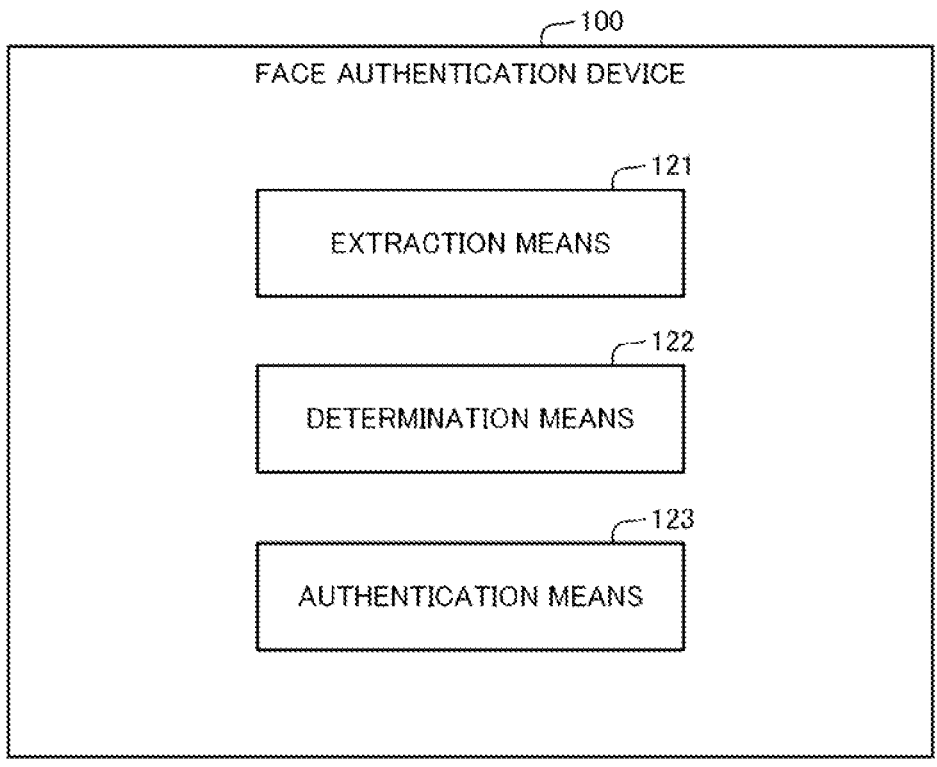
FIG. 9 is a block diagram illustrating a configuration of the face authentication device according to the second exemplary embodiment of the present invention.
Figure 10:
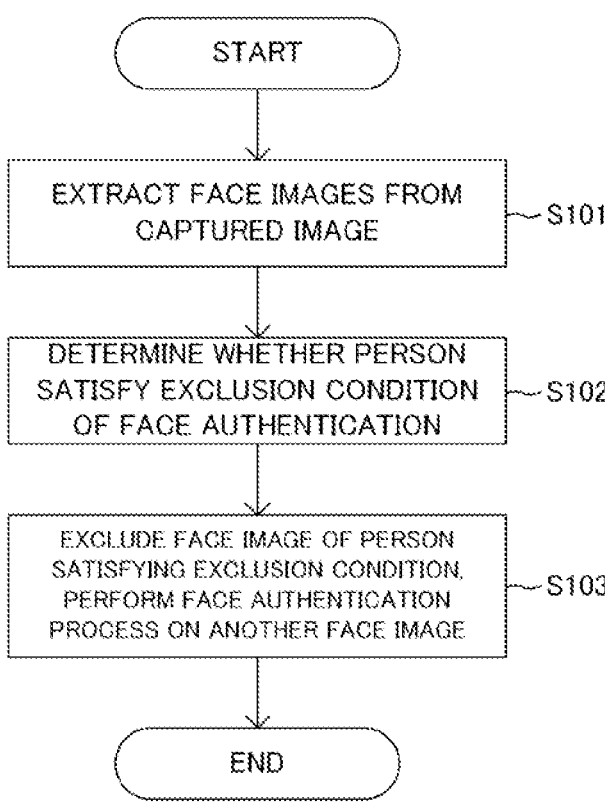
FIG. 10 is a flowchart illustrating an operation of the face authentication device according to the second exemplary embodiment of the present invention.

Next, a second exemplary embodiment of the present invention will be described with reference to FIGS. 8 to 10. FIGS. 8 and 9 are block diagrams illustrating the configuration of a face authentication device of the second exemplary embodiment, and FIG. 10 is a flowchart illustrating the operation of the face authentication device. Note that the present embodiment shows the outlines of the configurations of the face authentication device and the face authentication method described in the embodiment described above.

First, a hardware configuration of a face authentication device 100 in the present embodiment will be described with reference to FIG. 8. The face authentication device 100 is configured of a typical information processing device, having a hardware configuration as described below as an example.

Central Processing Unit (CPU) 101 (arithmetic device)
Read Only Memory (ROM) 102 (storage device)
Random Access Memory (RAM) 103 (storage device)
Program group 104 to be loaded to the RAM 103
Storage device 105 storing therein the program group 104
Drive 106 that performs reading and writing on a storage medium 110 outside the information processing device
Communication interface 107 connecting to a communication network 111 outside the information processing device
Input/output interface 108 for performing input/output of data
Bus 109 connecting the respective constituent elements The face authentication device 100 can construct, and can be equipped with, an extraction means 121, a determination means 122, and an authentication means 123 illustrated in FIG. 9 through acquisition and execution of the program group 104 by the CPU 101. Note that the program group 104 is stored in the storage device 105 or the ROM 102 in advance, and is loaded to the RAM 103 and executed by the CPU 101 as needed. Alternatively, the program group 104 may be provided to the CPU 101 via the communication network 111, or may be stored on the storage medium 110 in advance and read out by the drive 106 and supplied to the CPU 101. However, the extraction means 121, the determination means 122, and the authentication means 123 may be constructed by dedicated electronic circuits for implementing such means.

Note that FIG. 8 illustrates an example of the hardware configuration of the information processing device that is the face authentication device 100. The hardware configuration of the information processing device is not limited to that described above. For example, the information processing device may be configured of part of the configuration described above, such as without the drive 106.

The face authentication device 100 executes the face authentication method illustrated in the flowchart of FIG. 10, by the functions of the extraction means 121, the determination means 122, and the authentication means 123 constructed by the program as described above.

As illustrated in FIG. 10, the face authentication device 100 performs processing to extract a plurality of face images in a captured image (step S101), on the basis of at least one of the face images, determine whether or not a person of the face image satisfies an exclusion condition of a face authentication process (step S102), and exclude the face image of the person satisfying the exclusion condition, and perform the face authentication process on another one of the face images to authenticate whether or not a person of the other one of the face images is a registered person (step S103).

Since the present invention is configured as described above, in the present invention, face images of a plurality of persons are extracted, and from such face images, it is determined whether or not each person satisfies the exclusion condition of the face authentication process, and the face authentication process is not performed on the face image satisfying the exclusion condition, and the face authentication process is performed only on the other face images. Therefore, when an accompanying person of a person who is a registered person on which face authentication should be performed satisfies the exclusion condition of the face authentication process, the face authentication process is not performed on the accompanying person. Therefore, it is possible to prevent an unnecessary face authentication process from being performed, and to realize the face authentication process smoothly.

Note that the program described above can be supplied to a computer by being stored in a non-transitory computer-readable medium of any type. Non-transitory computer-readable media include tangible storage media of various types. Examples of non-transitory computer-readable media include magnetic storage media (for example, flexible disk, magnetic tape, and hard disk drive), magneto-optical storage media (for example, magneto-optical disk), a CD-ROM (Read Only Memory), a CD-R, a CD-R/W, and semiconductor memories (for example, mask ROM, PROM (Programmable ROM), EPROM (Erasable PROM), a flash ROM, and a RAM (Random Access Memory)). Note that the program may be supplied to a computer by being stored in a transitory computer-readable medium of any type. Examples of transitory computer-readable media include electric signals, optical signals, and electromagnetic waves. A transitory computer-readable medium can supply the program to a computer via a wired communication channel such as a wire or an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art. Further, at least one of the functions of the extraction means 121, the determination means 122, and the authentication means 123 described above may be carried out by an information processing device provided and connected to any location on the network, that is, may be carried out by so-called cloud computing.

Supplementary Notes

The whole or part of the exemplary embodiments disclosed above can be described as the following supplementary notes. Hereinafter, outlines of the configurations of a face authentication method, a face authentication device, and a program, according to the present invention, will be described. However, the present invention is not limited to the configurations described below.

Supplementary Note 1

A face authentication method comprising:

extracting a plurality of face images in a captured image;

on a basis of at least one of the face images, determining whether or not a person of the face image satisfies an exclusion condition of a face authentication process; and excluding the face image of the person satisfying the exclusion condition, and performing the face authentication process on another one of the face images to authenticate whether or not a person of the other one of the face images is a registered person.

Supplementary Note 2

The face authentication method according to supplementary note 1, further comprising on the basis of at least one of the face images, detecting an attribute of the person of the face image, and determining whether or not the person satisfies the exclusion condition on a basis of the attribute.

Supplementary Note 3

The face authentication method according to supplementary note 2, further comprising on the basis of at least one of the face images, detecting age of the person of the face image, and determining whether or not the person satisfies the exclusion condition on a basis of the age.

Supplementary Note 4

The face authentication method according to supplementary note 3, further comprising determining that the person satisfies the exclusion condition when the age of the person of the face image is an age that is determined to be a child according to a preset reference.

Supplementary Note 5

The face authentication method according to any of supplementary notes 1 to 4, further comprising on a basis of the plurality of face images, detecting an attribute of a person of at least one of the face images, and determining whether or not the person satisfies the exclusion condition on a basis of the attribute.

Supplementary Note 6

The face authentication method according to supplementary note 5, further comprising on a basis of a distance between persons of the plurality of face images, detecting age of a person of at least one of the face images, and determining whether or not the person satisfies the exclusion condition on a basis of the age.

Supplementary Note 6.1

The face authentication method according to any of supplementary notes 1 to 6, further comprising before performing calculation of a feature amount on the face image required for the face authentication process, determining whether or not the person of the face image satisfies the exclusion condition on a basis of the face image.

Supplementary Note 7

The face authentication method according to any of supplementary notes 1 to 6, further comprising performing control to open a predetermined gate when the face authentication process succeeded, the face authentication process being performed on at least one of the face images among the plurality of face images simultaneously extracted from a captured image excluding the face image of the person satisfying the exclusion condition.

Supplementary Note 8

The face authentication method according to supplementary note 7, further comprising performing the control to open the predetermined gate when the face authentication process succeeded, the face authentication process being performed on all of the face images among the plurality of face images simultaneously extracted from the captured image excluding the face image of the person satisfying the exclusion condition.

Supplementary Note 9

A face authentication device comprising:

extraction means for extracting a plurality of face images in a captured image;

determination means for, on a basis of at least one of the face images, determining whether or not a person of the face image satisfies an exclusion condition of a face authentication process; and authentication means for excluding the face image of the person satisfying the exclusion condition, and performing the face authentication process on another one of the face images to authenticate whether or not a person of the other one of the face images is a registered person.

Supplementary Note 9.1

The face authentication device according to supplementary note 9, wherein on the basis of at least one of the face images, the determination means detects an attribute of the person of the face image, and determines whether or not the person satisfies the exclusion condition on a basis of the attribute.

Supplementary Note 9.2

The face authentication device according to supplementary note 9.1, wherein
on the basis of at least one of the face images, the determination means detects age of the person of the face image, and determines whether or not the person satisfies the exclusion condition on a basis of the age.

Supplementary Note 9.3

The face authentication device according to supplementary note 9.2, wherein
the determination means determines that the person satisfies the exclusion condition when the age of the person of the face image is an age that is determined to be a child according to a preset reference.

Supplementary Note 9.4

The face authentication device according to any of supplementary notes 9 to 9.3, wherein
on a basis of the plurality of face images, the determination means detects an attribute of a person of at least one of the face images, and determines whether or not the person satisfies the exclusion condition on a basis of the attribute.

Supplementary Note 9.5

The face authentication device according to supplementary note 9.4, wherein
on a basis of a distance between persons of the plurality of face images, the determination means detects age of a person of at least one of the face images, and determines whether or not the person satisfies the exclusion condition on a basis of the age.

Supplementary Note 9.6

The face authentication device according to any of supplementary notes 9 to 9.5, wherein
before performing calculation of a feature amount on the face image required for the face authentication process, the determination means determines whether or not the person of the face image satisfies the exclusion condition on a basis of the face image.

Supplementary Note 9.7

The face authentication device according to any of supplementary notes 9 to 9.6, further comprising
gate control means for performing control to open a predetermined gate when the face authentication process succeeded, the face authentication process being performed on at least one of the face images among the plurality of face images simultaneously extracted from the captured image excluding the face image of the person satisfying the exclusion condition.

Supplementary Note 9.8

The face authentication device according to supplementary note 9.7, wherein
the gate control means performs the control to open the predetermined gate when the face authentication process succeeded, the face authentication process being performed on all of the face images among the plurality of face images simultaneously extracted from the captured image excluding the face image of the person satisfying the exclusion condition.

Supplementary Note 10

A computer-readable medium storing thereon a program for causing an information processing device to execute processing to:
extract a plurality of face images in a captured image;
on a basis of at least one of the face images, determine whether or not a person of the face image satisfies an exclusion condition of a face authentication process; and
exclude the face image of the person satisfying the exclusion condition, and perform the face authentication process on another one of the face images to authenticate whether or not a person of the other one of the face images is a registered person.

Supplementary Note 10.1

The computer-readable medium storing thereon the program according to supplementary note 10, the program further causing the information processing device to execute processing to
perform control to open a predetermined gate when the face authentication process succeeded, the face authentication process being performed on at least one of the face images among the plurality of face images simultaneously extracted from the captured image excluding the face image of the person satisfying the exclusion condition.

Supplementary Note 10.2

The computer-readable medium storing thereon the program according to supplementary note 10.1, the program further causing the information processing device to execute processing to
perform the control to open the predetermined gate when the face authentication process succeeded, the face authentication process being performed on all of the face images among the plurality of face images simultaneously extracted from the captured image excluding the face image of the person satisfying the exclusion condition.

The present invention is based upon and claims the benefit of priority from Japanese patent application No. 2020-104263, filed on Jun. 17, 2020, the disclosure of which is incorporated herein in its entirety by reference.

REFERENCE SIGNS LIST

1 face authentication device
11 image acquisition unit
12 face extraction unit
13 exclusion determination unit
14 face authentication unit
15 gate control unit
16 user information storage unit
C camera
D display
G gate
P1, P2, P11, P12, P13, P21, P22 person
R1, R2, R21, R22 face image area

15

100 face authentication device
101 CPU
102 ROM
103 RAM
104 program group
105 storage device
106 drive
107 communication interface
108 input/output interface
109 bus
110 storage medium
111 communication network
121 extraction means
122 determination means
123 authentication means

What is claimed is:

1. A face authentication method comprising:
extracting a plurality of face images in a captured image captured in front of a first gate, the plurality of face images corresponding to people accompanying each other in front of the first gate;
determining whether or not a first person of a first face image, among the plurality of face images, satisfies an exclusion condition of a face authentication process, the exclusion condition indicating an age group;
performing the face authentication process on one or more persons in the captured image by:
excluding the first face image of the first person satisfying the exclusion condition, and
performing the face authentication process on a second face image of a second person, among the plurality of face images, to authenticate whether or not the second person of the second face image is a registered person; and
sending a command to the first gate to open the first gate to allow entry of the second person and the first person when the face authentication process succeeded, the face authentication process being performed on at least one of the plurality of face images simultaneously extracted from the captured image excluding the first face image of the first person satisfying the exclusion condition.

2. The face authentication method according to claim 1, further comprising
based on at least one of the plurality of face images, detecting an attribute of the first person of the first face image, and determining whether or not the first person satisfies the exclusion condition based on the attribute.

3. The face authentication method according to claim 2, further comprising
based on at least one of the plurality of face images, detecting an age of the first person of the first face image, and determining whether or not the first person satisfies the exclusion condition based on the age.

4. The face authentication method according to claim 3, further comprising
determining that the first person satisfies the exclusion condition when the age of the first person of the first face image is an age that is determined to be a child according to a preset reference.

5. The face authentication method according to claim 1, further comprising
based on the plurality of face images, detecting an attribute of the first person of the first face image, and determining whether or not the first person satisfies the exclusion condition based on the attribute.

6. The face authentication method according to claim 5, further comprising
based on a distance between persons of the plurality of face images, detecting an age of the first person of the first face image, among the plurality of face images, and determining whether or not the first person satisfies the exclusion condition based on the age.

7. The face authentication method according to claim 1, further comprising
before performing calculation of a feature amount on the first face image required for the face authentication process, determining whether or not the first person of the first face image satisfies the exclusion condition based on the first face image.

8. The face authentication method according to claim 1, wherein the face authentication process is performed on all of the plurality of face images simultaneously extracted from the captured image excluding the first face image of the first person satisfying the exclusion condition.

9. A face authentication device comprising:
at least one memory configured to store instructions; and
at least one processor configured to execute instructions to:
extract a plurality of face images in a captured image captured in front of a first gate, the plurality of face images corresponding to people accompanying each other in front of the first gate;
determine whether or not a first person of a first face image, among the plurality of face images, satisfies an exclusion condition of a face authentication process, the exclusion condition indicating an age group;
perform the face authentication process on one or more persons in the captured image by:
excluding the first face image of the first person satisfying the exclusion condition, and
performing the face authentication process on a second face image of a second person, among the plurality of face images, to authenticate whether or not the second person of the second face image is a registered person; and
send a command to the first gate to open the first gate to allow entry of the second person and the first person when the face authentication process succeeded, the face authentication process being performed on at least one of the plurality of face images simultaneously extracted from the captured image excluding the first face image of the first person satisfying the exclusion condition.

10. The face authentication device according to claim 9, wherein the at least one processor is configured to execute the instructions to
based on at least one of the plurality of face images, detect an attribute of the first person of the first face image, and determine whether or not the first person satisfies the exclusion condition based on the attribute.

11. The face authentication device according to claim 10, wherein the at least one processor is configured to execute the instructions to
based on at least one of the plurality of face images, detect an age of the first person of the first face image, and determine whether or not the first person satisfies the exclusion condition based on the age.

12. The face authentication device according to claim 11, wherein the at least one processor is configured to execute the instructions to determine that the first person satisfies the exclusion condition when the age of the first person of the first face image is an age that is determined to be a child according to a preset reference.

13. The face authentication device according to claim 9, wherein the at least one processor is configured to execute the instructions to based on the plurality of face images, detect an attribute of the first person of the first face image, and determine whether or not the first person satisfies the exclusion condition on a basis of the attribute.

14. The face authentication device according to claim 13, wherein the at least one processor is configured to execute the instructions to based on a distance between persons of the plurality of face images, detect an age of the first person of the first face image, among the plurality of face images, and determine whether or not the first person satisfies the exclusion condition based on the age.

15. The face authentication device according to claim 9, wherein the at least one processor is configured to execute the instructions to before performing calculation of a feature amount on the first face image required for the face authentication process, determine whether or not the first person of the first face image satisfies the exclusion condition based on the first face image.

16. The face authentication device according to claim 9, wherein the face authentication process is performed on all of the plurality of face images simultaneously extracted from the captured image excluding the first face image of the first person satisfying the exclusion condition.

17. A non-transitory computer-readable medium storing thereon a program comprising instructions for causing an information processing device to execute processing to:

extract a plurality of face images in a captured image captured in front of a first gate, the plurality of face images corresponding to people accompanying each other in front of the first gate;

determine whether or not a first person of a first face image, among the plurality of face images, satisfies an exclusion condition of a face authentication process, the exclusion condition indicating an age group;

perform the face authentication process on one or more persons in the captured image by:

excluding the first face image of the first person satisfying the exclusion condition, and performing the face authentication process on a second face image of a second person, among the plurality of face images, to authenticate whether or not the second person of the second face image is a registered person; and send a command to the first gate to open the first gate to allow entry of the second person and the first person when the face authentication process succeeded, the face authentication process being performed on at least one of the plurality of face images simultaneously extracted from the captured image excluding the first face image of the first person satisfying the exclusion condition.

18. The face authentication method according to claim 1, further comprising sending the command to the first gate to open the first gate to allow entry of the second person and the people accompanying the second person when the face authentication process succeeded.

*   *   *   *   *